April 22, 1930.  E. O. MUNKTELL  1,755,744
GOFFERED ARTICLE
Filed May 26, 1926

E. O. Munktell
INVENTOR

By Marks & Clerk
Attys.

Patented Apr. 22, 1930

1,755,744

UNITED STATES PATENT OFFICE

ERNST OLOF MUNKTELL, OF STOCKHOLM, SWEDEN

GOFFERED ARTICLE

Application filed May 26, 1926, Serial No. 111,897, and in Sweden May 26, 1925.

My invention relates to a new article of manufacture, which is to be a substitute for cotton-, linen- or like fabrics in manufacturing of cloths for tables, trays, towels, handkerchiefs, sheets, coats for doctors and hairdressers and so on.

As start material in the article is used wadding of cellulose. The wrinkled or unwrinkled material is in one or more layers in short or long lengths pressed between goffering-cylinders, whereupon they are impregnated with an impregnating liquid consisting in suitable parts of water, starch, borax, japan wax, casein, blanc-fixe, gleatine, sulfuric acid, asbestine or with solutions of nitro- or acetylcellulose, gelatine, glue, casein, with or without indurators as formaldehyde, or softeners as glycerine. The surface-layers of the product may also be provided with certain coverings of nitro- or acetylcellulose gum solution, gelatine, glue, paraffin, paraffinoil, waxes as ceresin or beeswax. After the impregnation the product is pressed in order to felt it together. Then it can pass a pattern press or between pattern rolls to obtain a suitable appearance, after which the product may be pressed again.

By cellulose wadding I mean a soft, felted material of thin, fine cellulose fibers which is so porous that the porosity is macroscopical. It is produced wrinkled as well as unwrinkled.

Figure 1:
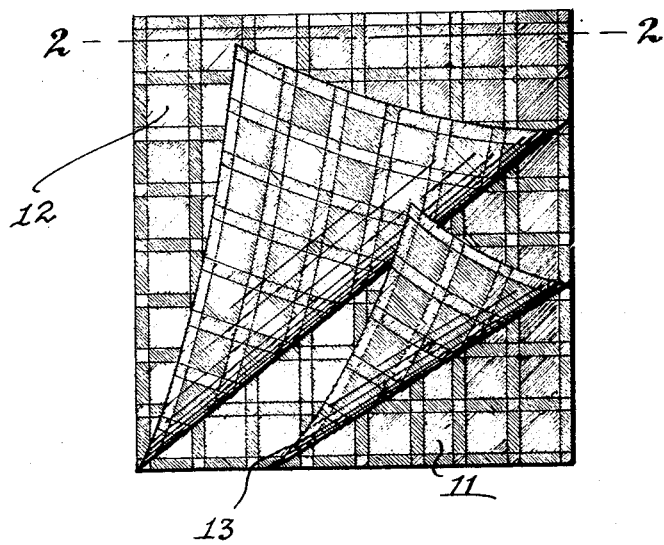
Figure 2:
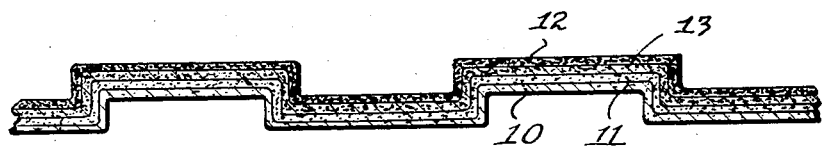

In the accompanying drawing the article forming the subject-matter of the present invention is illustrated, and Figure 1 is a top plan view of the article and Figure 2 a transverse section along line 2—2 of Figure 1.

In the drawing, reference numeral 10 represents the bottom layer of the wadding suitably prepared and reference numeral 11 a second layer of the same material, while reference numerals 12 and 13 respectively represent the first and second surface layers which may be provided with certain coverings as described.

What I claim is:—

1. The process of preparing a thin soft flexible laminated cellulose product which comprises goffering a plurality of thin layers of cellulose wadding laid upon each other, then impregnating the goffered material and thereafter pressing the impregnated material in order to felt the layers of cellulose wadding together.

2. The process of preparing a thin soft flexible laminated cellulose product which comprises goffering a plurality of thin layers of cellulose wadding laid upon each other, then impregnating the goffered material and thereafter pressing the impregnated material in order to felt the layers of cellulose wadding together and thereafter pressing a pattern on the product.

E. O. MUNKTELL.